US012717052B2

(12) United States Patent
Peng et al.

(10) Patent No.: US 12,717,052 B2
(45) Date of Patent: Aug. 25, 2026

(54) METHOD AND APPARATUS FOR CALIBRATING THREE-DIMENSIONAL CAMERA IN X-RAY IMAGING, AND STORAGE MEDIUM

(71) Applicant: Siemens Shanghai Medical Equipment Ltd., Shanghai (CN)

(72) Inventors: Xi Shuai Peng, Shanghai (CN); Xin Luo, Shanghai (CN); Shuai Hua Huang, Shanghai (CN)

(73) Assignee: Siemens Shanghai Medical Equipment Ltd., Shanghai (CN)

( * ) Notice: Subject to any disclaimer, the term of this patent is extended or adjusted under 35 U.S.C. 154(b) by 198 days.

(21) Appl. No.: 18/694,011

(22) PCT Filed: Oct. 13, 2022

(86) PCT No.: PCT/CN2022/125176

§ 371 (c)(1), (2) Date: Mar. 21, 2024

(87) PCT Pub. No.: WO2023/093347

PCT Pub. Date: Jun. 1, 2023

(65) Prior Publication Data

US 2024/0427037 A1 Dec. 26, 2024

(30) Foreign Application Priority Data

Nov. 25, 2021 (CN) ......................... 202111413897.7

(51) Int. Cl.
*G01T 7/00* (2006.01)

(52) U.S. Cl.
CPC .................................... *G01T 7/005* (2013.01)

(58) Field of Classification Search
CPC ...................................................... G01T 7/005
See application file for complete search history.

(56) References Cited

U.S. PATENT DOCUMENTS

2002/0044631 A1* 4/2002 Graumann ............. A61B 34/20 378/162
2006/0079757 A1* 4/2006 Smith ..................... G06T 15/06 600/416

(Continued)

FOREIGN PATENT DOCUMENTS

CN 108926355 A 12/2018
CN 110559077 A 12/2019

(Continued)

OTHER PUBLICATIONS

Li Jing et al: "A Fully Automatic Surgical Registration Method for Percutaneous Abdominal Puncture Surgical Navigation", Computers in Biology and Medicine, vol. 136, p. 1-12, Jul. 29, 2021.

(Continued)

*Primary Examiner* — Hugh Maupin
(74) *Attorney, Agent, or Firm* — Banner & Witcoff, Ltd.

(57) ABSTRACT

The present disclosure is directed to calibrating a three-dimensional camera in X-ray imaging, and a storage medium. The techniques described include: acquiring a three-dimensional image of a calibration plate captured by a three-dimensional camera, where the calibration plate includes a positioning marker, and the calibration plate has a predetermined distance from an X-ray tube; determining first three-dimensional coordinates of the positioning marker in a three-dimensional camera coordinate system on the basis of the three-dimensional image; determining second three-dimensional coordinates of the positioning marker in an X-ray tube coordinate system on the basis of the distance; and determining, on the basis of the first three-dimensional coordinates and the second three-dimensional coordinates, a transformation matrix adapted to calibrate the three-dimensional camera. The described techniques may address the system error caused by the coordinate system difference.

13 Claims, 6 Drawing Sheets

(56) References Cited

U.S. PATENT DOCUMENTS

| | | | | |
|---|---|---|---|---|
| 2011/0082367 | A1* | 4/2011 | Regazzoni ............. | A61B 34/20<br>600/425 |
| 2012/0014579 | A1* | 1/2012 | Li ........................... | G06T 7/285<br>382/131 |
| 2014/0064458 | A1* | 3/2014 | Jobst ...................... | A61B 6/585<br>378/207 |
| 2014/0221824 | A1* | 8/2014 | Rai .......................... | A61B 6/12<br>600/424 |
| 2017/0100089 | A1 | 4/2017 | Chang et al. | |
| 2018/0144501 | A1 | 5/2018 | Albiol Colomer et al. | |
| 2018/0235566 | A1 | 8/2018 | Tamersoy et al. | |
| 2018/0338742 | A1* | 11/2018 | Singh ..................... | A61B 6/587 |
| 2020/0394821 | A1 | 12/2020 | Huang et al. | |
| 2023/0363830 | A1* | 11/2023 | Polchin ................ | A61B 5/7425 |

FOREIGN PATENT DOCUMENTS

| | | | |
|---|---|---|---|
| CN | 112085797 | A | 12/2020 |
| EP | 1760457 | A2 | 3/2007 |
| EP | 3671111 | A1 | 6/2020 |

OTHER PUBLICATIONS

Jan. 19, 2023 (PCT) International Search Report and Written Opinion—App. PCT/CN2022/125176.

* cited by examiner

METHOD AND APPARATUS FOR CALIBRATING THREE-DIMENSIONAL CAMERA IN X-RAY IMAGING, AND STORAGE MEDIUM

CROSS-REFERENCE TO RELATED APPLICATIONS

The present application is a national stage entry of PCT application no. PCT/CN2022/125176, filed Oct. 13, 2022, which claims priority to and the benefit of China Patent Application no. CN 202111413897.7, filed Nov. 25, 2021, the contents of each of which being incorporated herein by reference in their entirety.

TECHNICAL FIELD

The present disclosure relates to the technical field of medical imaging, in particular to a method and apparatus for calibrating a three-dimensional (3D) camera in X-ray imaging, and a storage medium.

BACKGROUND

An X-ray imaging system generally includes an X-ray generation assembly, a Bucky-wall-stand (BWS) assembly, an examination table assembly, a film cassette assembly including a flat panel detector, a remote control host, etc. The X-ray generation assembly uses high voltage provided by a high voltage generator to emit X-rays that transmit through and radiate an imaging target, and forms medical image information of the imaging target on the flat panel detector. The flat panel detector transmits the medical image information to the control host. The imaging target can stand near the BWS assembly or lie on the examination table assembly, so as to undergo X-ray photography on different parts such as head, chest, abdomen, and joints, separately.

3D cameras are widely applied in X-ray imaging systems to implement various measurement-related functions (e.g., virtual collimation). Positioning information in a 3D photo taken by a 3D camera is usually based on a 3D camera coordinate system, while many parameters in an X-ray imaging application are based on an X-ray tube coordinate system, such that if the positioning information determined on the basis of the 3D photo is directly applied to the X-ray imaging application, a system error may be caused.

SUMMARY

Embodiments of the present disclosure provide a method and apparatus for calibrating a 3D camera in X-ray imaging, and a storage medium.

A method for calibrating a 3D camera in X-ray imaging, the method including:

- acquiring a 3D image of a calibration plate captured by a 3D camera, where the calibration plate includes a positioning marker, and the calibration plate has a predetermined distance from an X-ray tube;
- determining first 3D coordinates of the positioning marker in a 3D camera coordinate system on the basis of the 3D image;
- determining second 3D coordinates of the positioning marker in an X-ray tube coordinate system on the basis of the distance; and
- determining, on the basis of the first 3D coordinates and the second 3D coordinates, a transformation matrix adapted to calibrate the 3D camera.

Hence, in the embodiments of the present disclosure, the transformation matrix is determined on the basis of a transformation relationship between 3D coordinates of the positioning marker in the calibration plate in the X-ray tube coordinate system and 3D coordinates of the positioning marker in the 3D camera coordinate system, so as to implement calibration of the 3D camera and eliminate the system error caused by the coordinate system difference.

In one embodiment, the center of the calibration plate does not coincide with the radiation field center of the X-ray tube; the calibration plate is disposed in an XY plane including an X axis and a Y axis; and the method further includes:

- moving the calibration plate within the XY plane until the center of the calibration plate coincides with the radiation field center of the X-ray tube.

Therefore, in a case that the center of the calibration plate does not coincide with the radiation field center of the X-ray tube, the calibration plate is moved to make the center of the calibration plate coincide with the radiation field center of the X-ray tube. As a result, 3D coordinates of the center of the calibration plate in the X-ray tube coordinate system can be simplified, and thus a computation process of the transformation matrix is simplified.

In one embodiment, the determining second 3D coordinates of the positioning marker in an X-ray tube coordinate system on the basis of the distance includes:

- determining 3D coordinates (0, 0, h) of the center of the calibration plate in the X-ray tube coordinate system, where h represents the distance;
- determining a distance vector T between the positioning marker and the center of the calibration plate;
- determining a component x of the distance vector T on the X axis and a component y of the distance vector T on the Y axis; and
- determining the second 3D coordinates (x, y, h).

Hence, 3D coordinates of the center of the calibration plate in the X-ray tube coordinate system are simplified, and the second 3D coordinates are computed quickly.

In one embodiment, the center of the calibration plate does not coincide with the radiation field center of the X-ray tube; the calibration plate is disposed in an XY plane including an X axis and a Y axis; and

- the determining second 3D coordinates of the positioning marker in an X-ray tube coordinate system on the basis of the distance includes:
- determining 3D coordinates ($\Delta x$, $\Delta y$, h) of the center of the calibration plate in the X-ray tube coordinate system, where h represents the distance, $\Delta x$ represents a component of a distance vector between the radiation field center and the center of the calibration plate on the X axis, and $\Delta y$ represents a component of the distance vector between the radiation field center and the center of the calibration plate on the Y axis; determining a distance vector T between the positioning marker and the center of the calibration plate; determining a component x of the distance vector T on the X axis and a component y of the distance vector T on the Y axis; and determining the second 3D coordinates ($\Delta x+x$, $\Delta y+y$, h) of the positioning marker.

Therefore, the process of moving the calibration plate to make the center of the calibration plate coincide with the radiation field center of the X-ray tube can be omitted, and thus operation steps are simplified.

In one embodiment, the method further includes:

- determining a set radiation field range and an actual radiation field range on the calibration plate corresponding to the set radiation field range; and determining a radiation field width calibration parameter $\gamma_w$ and a radiation field height calibration parameter $\gamma_h$, where $$\gamma_w = \frac{w_c * SID}{H_1 * w_s} \text{ and } \gamma_h = \frac{h_c * SID}{H_1 * h_S},$$

where $H_1$ represents the distance, SID represents a preset source to image distance, $w_s$ represents the width in the set radiation field range, $h_s$ represents the height in the set radiation field range, $w_c$ represents the width in the actual radiation field range, and $h_c$ represents the height in the actual radiation field range.

Hence, the width and height of a radiation field can also be calibrated to eliminate the system error caused by the radiation field difference.

In one embodiment, the determining a set radiation field range and an actual radiation field range on the calibration plate corresponding to the set radiation field range includes:

determining the actual radiation field range on the basis of a user input; and make an adjustment to obtain the set radiation field range corresponding to the actual radiation field range; or determining the set radiation field range on the basis of a user input; and measuring the actual radiation field range corresponding to the set radiation field range.

Therefore, the set radiation field range and the actual radiation field range can be determined in many ways to adapt to various implementation environments.

In one embodiment, the method further includes:

adjusting the distance m times, and determining the first 3D coordinates and the second 3D coordinates after each distance adjustment, where m is a positive integer greater than or equal to 1; and the determining, on the basis of the first 3D coordinates and the second 3D coordinates, a transformation matrix adapted to calibrate the 3D camera includes:

determining a translation vector T and a rotation matrix R, where $$T = \overline{q} = R\overline{p} \text{ and}$$

$$R = V \begin{pmatrix} 1 & 0 & 0 \\ 0 & \cdots & 0 \\ 0 & 0 & det(VU^{\tau}) \end{pmatrix} U^{\tau},$$

where $$\overline{q} = \frac{\sum_i q_i}{N}, \overline{p} = \frac{\sum_i p_i}{N},$$

N is the number of positioning markers, i is the serial number of distance adjustment, det is a determinant function, U and V are singular value decomposition of $M=(P-\overline{q})(Q-\overline{q})^T$, $q_i$ is the second 3D coordinates determined in an i-th distance adjustment, $p_i$ is the first 3D coordinates determined in the i-th distance adjustment, and the value range of i is [0, m]; and determining the transformation matrix on the basis of the translation vector T and the rotation matrix R.

Therefore, the transformation matrix is determined using multiple distance adjustments, such that the accuracy is improved.

An apparatus for calibrating a 3D camera in X-ray imaging, the apparatus including:

an acquiring module, configured to acquire a 3D image of a calibration plate captured by a 3D camera, where the calibration plate includes a positioning marker, and the calibration plate has a predetermined distance from an X-ray tube;

a first determining module, configured to determine first 3D coordinates of the positioning marker in a 3D camera coordinate system on the basis of the 3D image;

a second determining module, configured to determine second 3D coordinates of the positioning marker in an X-ray tube coordinate system on the basis of the distance; and a third determining module, configured to determine, on the basis of the first 3D coordinates and the second 3D coordinates, a transformation matrix adapted to calibrate the 3D camera.

Hence, in the embodiments of the present disclosure, the transformation matrix is determined on the basis of a transformation relationship between 3D coordinates of the positioning marker in the calibration plate in the X-ray tube coordinate system and 3D coordinates of the positioning marker in the 3D camera coordinate system, so as to implement calibration of the 3D camera and eliminate the system error caused by the coordinate system difference.

In one embodiment, the center of the calibration plate does not coincide with the radiation field center of the X-ray tube; the calibration plate is disposed in an XY plane including an X axis and a Y axis; and the acquiring module is further configured to move the calibration plate within the XY plane until the center of the calibration plate coincides with the radiation field center of the X-ray tube.

Therefore, in a case that the center of the calibration plate does not coincide with the radiation field center of the X-ray tube, the calibration plate is moved to make the center of the calibration plate coincide with the radiation field center of the X-ray tube. As a result, 3D coordinates of the center of the calibration plate in the X-ray tube coordinate system can be simplified, and thus a computation process of the transformation matrix is simplified.

In one embodiment, the second determining module is configured to: determine 3D coordinates (0, 0, h) of the center of the calibration plate in the X-ray tube coordinate system, where h represents the distance; determine a distance vector T between the positioning marker and the center of the calibration plate; determine a component x of the distance vector T on the X axis and a component y of the distance vector T on the Y axis; and determine the second 3D coordinates (x, y, h).

Hence, 3D coordinates of the center of the calibration plate in the X-ray tube coordinate system are simplified, and the second 3D coordinates are computed quickly.

In one embodiment, the center of the calibration plate does not coincide with the radiation field center of the X-ray tube; the calibration plate is disposed in an XY plane including an X axis and a Y axis; and the second determining module is configured to: determine 3D coordinates (Δx, Δy, h) of the center of the calibration plate in the X-ray tube coordinate system, where h represents the distance, Δx represents a component of a distance vector between the radiation field center and the center of the calibration plate on the X axis, and Δy represents a component of the distance vector between the radiation field center and the center of the calibration plate on the Y axis; determine a distance vector T between the positioning marker and the center of the calibration plate; determine a component x of the distance vector T on the X axis and a component y of the distance vector T on the Y axis; and determine the second 3D coordinates (Δx+x, Δy+y, h) of the positioning marker.

Therefore, the process of moving the calibration plate to make the center of the calibration plate coincide with the radiation field center of the X-ray tube can be omitted, and thus operation steps are simplified.

In one embodiment, the apparatus further includes:

a fourth determining module, configured to determine a set radiation field range and an actual radiation field range on the calibration plate corresponding to the set radiation field range; and determine a radiation field width calibration parameter $\gamma_w$ and a radiation field height calibration parameter $\gamma_h$, where $$\gamma_w = \frac{w_c * SID}{H_1 * w_s} \text{ and } \gamma_h = \frac{h_c * SID}{H_1 * h_S},$$

where $H_1$ represents the distance, SID represents a preset source to image distance, $w_s$ represents the width in the set radiation field range, $h_s$ represents the height in the set radiation field range, $w_c$ represents the width in the actual radiation field range, and $h_c$ represents the height in the actual radiation field range.

Hence, the width and height of a radiation field can also be calibrated to eliminate the system error caused by the radiation field difference.

In one embodiment, the fourth determining module is configured to: determine the actual radiation field range on the basis of a user input; and make an adjustment to obtain the set radiation field range corresponding to the actual radiation field range; or, determine the set radiation field range on the basis of a user input; and measure the actual radiation field range corresponding to the set radiation field range on the calibration plate.

Therefore, the set radiation field range and the actual radiation field range can be determined in many ways to adapt to various implementation environments.

In one embodiment, the third determining module is further configured to: adjust the distance m times, and determine the first 3D coordinates and the second 3D coordinates after each distance adjustment, where m is a positive integer greater than or equal to 1; and determine a translation vector T and a rotation matrix R, where $$T = \overline{q} = R\overline{p} \text{ and } R = V\begin{pmatrix} 1 & 0 & 0 \\ 0 & \cdots & 0 \\ 0 & 0 & det(VU^T) \end{pmatrix}U^T, \text{ where } \overline{q} = \frac{\sum_i q_i}{N}, \overline{p} = \frac{\sum_i p_i}{N},$$

N is the number of positioning markers, i is the serial number of distance adjustment, det is a determinant function, U and V are singular value decomposition of $M=(P-\overline{q})(Q-\overline{q})^T$, $q_i$, is the second 3D coordinates determined in an i-th distance adjustment, $p_i$ is the first 3D coordinates determined in the i-th distance adjustment, and the value range of i is [0, m].

Therefore, the transformation matrix is determined using multiple distance adjustments, such that the accuracy is improved.

An apparatus for calibrating a 3D camera in X-ray imaging, the apparatus including a processor and a memory, where the memory stores an application executable by the processor and configured to enable the processor to execute the method for calibrating a 3D camera in X-ray imaging according to any one of the foregoing embodiments.

Hence, the embodiments of the present disclosure provide the 3D camera calibration apparatus having a processor-memory architecture. The transformation matrix is determined on the basis of a transformation relationship between 3D coordinates of the positioning marker in the calibration plate in the X-ray tube coordinate system and 3D coordinates of the positioning marker in the 3D camera coordinate system, so as to implement calibration of the 3D camera and eliminate the system error caused by the coordinate system difference.

A computer-readable storage medium, having computer-readable instructions stored thereon, where the computer-readable instructions are used for implementing the method for calibrating a 3D camera in X-ray imaging according to any one of the foregoing embodiments.

Therefore, the embodiments of the present disclosure provide the computer-readable storage medium including the computer-readable instructions. The transformation matrix is determined on the basis of a transformation relationship between 3D coordinates of the positioning marker in the calibration plate in the X-ray tube coordinate system and 3D coordinates of the positioning marker in the 3D camera coordinate system, so as to implement calibration of the 3D camera and eliminate the system error caused by the coordinate system difference.

BRIEF DESCRIPTION OF THE DRAWINGS

To enable a person of ordinary skill in the art to understand the foregoing and other features and advantages of the present disclosure more clearly, exemplary embodiments of the present disclosure are described in detail below with reference to the accompanying drawings. In the drawings.

Figure 1:
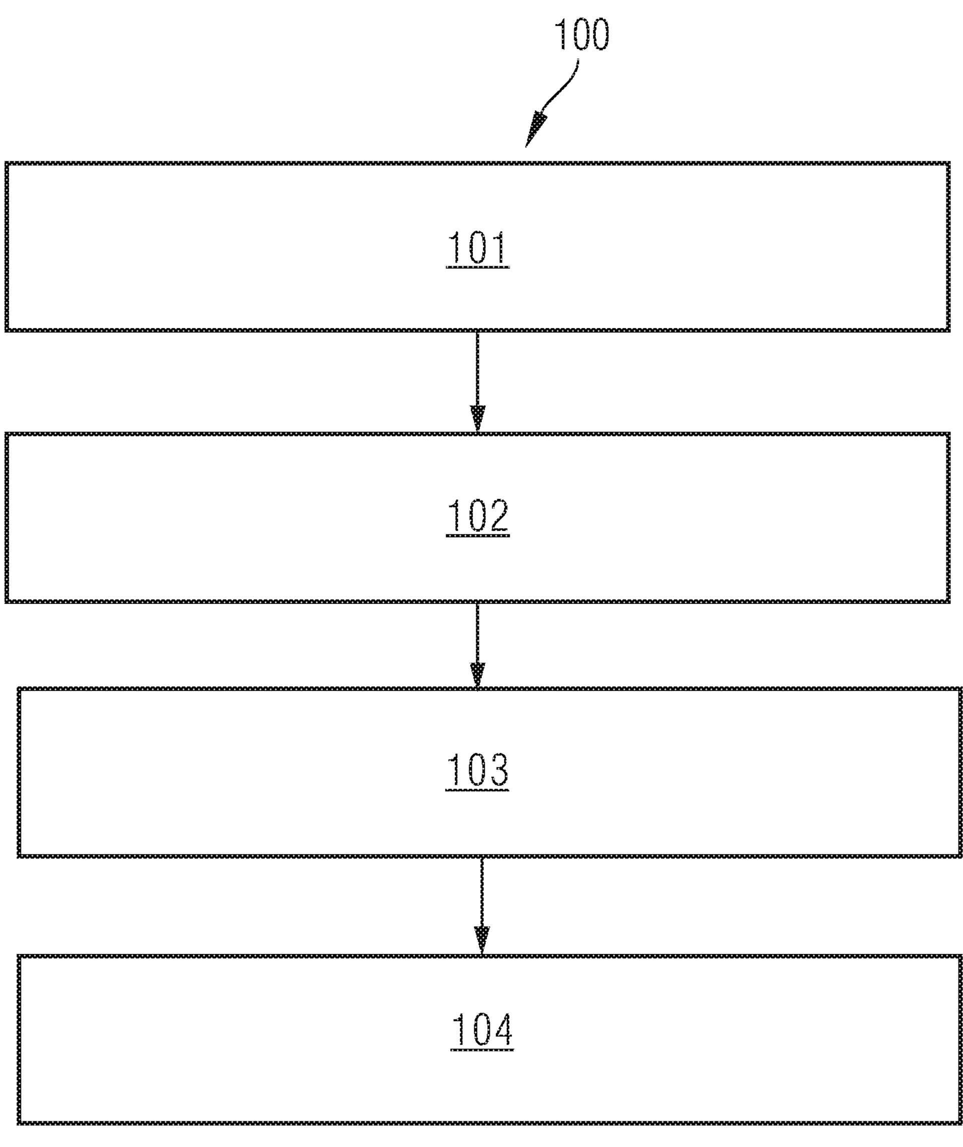
FIG. 1 is a flowchart of a method for calibrating a 3D camera in X-ray imaging according to embodiments of the present disclosure.

Reference numerals are as follows:

| Numerals | Meanings |
|---|---|
| 100 | A method for calibrating a 3D camera in X-ray imaging |
| 101-104 | Steps |
| 60 | Control host |
| 70 | Ceiling |
| 71 | X-ray tube |
| 72 | Collimator |
| 73 | X-ray source |
| 81 | 3D camera |
| 20 | Ground |
| 30 | Calibration plate |
| 300 | Calibration plate |
| 301-304 | Circles |
| 400 | Calibration plate |
| 401-404 | Concentric circles |
| 500 | An apparatus for calibrating a 3D camera in X-ray imaging |
| 501 | Acquiring module |
| 502 | First determining module |
| 502 | Second determining module |
| 503 | Third determining module |
| 504 | Fourth determining module |
| 600 | An apparatus for calibrating a 3D camera in X-ray imaging |
| 601 | Processor |
| 602 | Memory |

DETAILED DESCRIPTION OF THE DISCLOSURE

To make the objective, technical solutions, and advantages of the present disclosure clearer, the present disclosure is further described in detail below by using embodiments.

For the sake of conciseness and intuitiveness in description, the solutions of the present disclosure are explained below by describing several representative embodiments. A lot of details in the embodiments are provided only to aid in understanding the solutions of the present disclosure. However, it is obvious that the implementation of the technical solutions of the present disclosure may not be limited to these details. To avoid making the solutions of the present disclosure unclear unnecessarily, some embodiments are not described in detail, but merely outlined. In the following text, “including” means “including but not limited to”, and “according to . . . ” means “at least according to . . . , but not limited to, only according to . . . ”. In conformity with Chinese language habits, in the following text, in a case that the quantity of a component is not specified, it means that there may be one or more components, or it may be understood as that there is at least one component.

The applicant finds that: positioning information in a 3D photo taken by a 3D camera is usually based on a 3D camera coordinate system, while many parameters in an X-ray imaging application are based on an X-ray tube coordinate system, such that if the positioning information in the 3D photo is directly applied to the X-ray imaging application, a system error may be caused by the coordinate system difference. In embodiments of the present disclosure, the 3D camera is calibrated on the basis of the transformation matrix, so as to eliminate the system error caused by the coordinate system difference.

FIG. 1 is a flowchart of a method for calibrating a 3D camera in X-ray imaging according to embodiments of the present disclosure. Preferably, the method shown in FIG. 1 can be executed by a controller. The controller can be implemented as or integrated to a control host of an X-ray imaging system, and can also be implemented as a control unit independent of the control host.

As shown in FIG. 1, the method 100 includes the following steps:

Step 101: Acquire a 3D image of a calibration plate captured by a 3D camera, where the calibration plate includes a positioning marker, and the calibration plate has a predetermined distance from an X-ray tube.

The 3D camera is usually fixed onto a tube casing of the X-ray tube in an X-ray generation assembly, or fixed onto a collimator shell in the X-ray generation assembly. For example, a recess for accommodating the 3D camera is formed on the tube casing or the collimator shell, and the 3D camera is fixed into the recess through bolt connection, snap-fit connection, a steel wire loop, etc.

The calibration plate is configured to calibrate the 3D camera. The positioning marker for assisting positioning is disposed on the calibration plate, and one or more positioning markers, preferably more than one positioning markers, may be provided. For example, the positioning markers may be a plurality of circles, where the distance between every two adjacent circles is the same. In another example, the positioning markers may be a plurality of concentric circles, where the radius difference between adjacent concentric circles is the same.

In one embodiment, the calibration plate is disposed on the ground, the X-ray tube (not rotated) is aligned with the calibration plate on the ground, and the ray direction of the X-ray tube is perpendicular to the ground. In this case, the distance between the calibration plate and the X-ray tube is the vertical height from an X-ray source in the X-ray tube to the calibration plate.

In one embodiment, the calibration plate is disposed on the wall, an opening of the X-ray tube (not rotated) is aligned with the calibration plate on the wall, and then the ray direction of the X-ray tube is perpendicular to the wall. In this case, the distance between the calibration plate and the X-ray tube is the horizontal distance from an X-ray source in the X-ray tube to the calibration plate.

Typical examples of the calibration plate and the positioning marker are described exemplarily above, and a person skilled in the art can realize that such descriptions are only exemplary, and are not intended to limit the scope of protection of the embodiments of the present disclosure.

Step 102: Determine first 3D coordinates of the positioning marker in a 3D camera coordinate system on the basis of the 3D image.

The 3D camera coordinate system is a 3D rectangular coordinate system established with the focus center of the 3D camera as the origin and the optical axis as a Z axis. In the 3D camera coordinate system: (1) the origin is the focus center (i.e., the optical center) of the 3D camera; (2) an X axis in the 3D camera coordinate system is parallel to an X axis in an image plane; (3) a Y axis in the 3D camera coordinate system is parallel to a Y axis in the image plane; and (4) A Z axis in the 3D camera coordinate system is a camera optical axis, where the Z axis is perpendicular to the image plane. The image plane is a two-dimensional rectangular coordinate system.

In one embodiment, step 102 specifically includes: transforming the 3D image acquired in step 101 to a two-dimensional image, determining, from the two-dimensional image, two-dimensional coordinates of the positioning marker in an image coordinate system by using an image recognition algorithm, and then transforming the two-dimensional coordinates of the positioning marker in the image coordinate system to 3D coordinates (i.e., the first 3D coordinates) of the positioning marker in the 3D camera coordinate system on the basis of depth of field parameters of the 3D camera.

In one embodiment, step 102 specifically includes: determining 3D coordinates (i.e., the first 3D coordinates) of the positioning marker in the 3D image in the 3D camera coordinate system on the basis of a 3D positioning algorithm.

Step 103: Determine second 3D coordinates of the positioning marker in an X-ray tube coordinate system on the basis of the distance.

The X-ray tube coordinate system is a 3D rectangular coordinate system established with the X-ray source as the origin and the X-ray axis as a Z axis. In the X-ray tube coordinate system: (1) the origin is the X-ray source; (2) an X axis in the X-ray tube coordinate system is parallel to the X axis in the image plane; (3) a Y axis in the X-ray tube coordinate system is parallel to the Y axis in the image plane; and (4) a Z axis in the 3D camera coordinate system is the X-ray axis, where the Z axis is usually perpendicular to the calibration plate.

In one exemplary embodiment, the center of the calibration plate does not coincide with the radiation field center of the X-ray tube; the calibration plate is disposed in an XY plane including an X axis and a Y axis; and the method further includes: moving the calibration plate within the XY plane until the center of the calibration plate coincides with the radiation field center of the X-ray tube.

The radiation field center of the X-ray tube usually forms an imaging marker (e.g., a laser crosshair) on an imaging target.

In one case, it is found by manual observation that the center of the calibration plate does not coincide with the imaging marker, that is, it is manually determined that the center of the calibration plate does not coincide with the radiation field center of the X-ray tube. Then, the calibration plate is moved manually or automatically within the XY plane where the calibration plate is disposed, until the center of the calibration plate coincides with the radiation field center of the X-ray tube.

In one case, it is determined on the basis of an automatic optical recognition method that the center of the calibration plate does not coincide with the imaging marker, that is, it is automatically determined that the center of the calibration plate does not coincide with the radiation field center of the X-ray tube. Then, the calibration plate is moved manually or automatically within the XY plane where the calibration plate is disposed, until the center of the calibration plate coincides with the radiation field center of the X-ray tube.

After the center of the calibration plate coincides with the radiation field center of the X-ray tube, the 3D coordinates of the center of the calibration plate in the X-ray tube coordinate system can be simplified, and thus the subsequent computation process is simplified.

In one exemplary embodiment, the determining second 3D coordinates of the positioning marker in the X-ray tube coordinate system on the basis of the distance in step 103 includes: (1) determining 3D coordinates (0, 0, h) of the center of the calibration plate in the X-ray tube coordinate system, where h represents the distance; (2) determining a distance vector T between the positioning marker and the center of the calibration plate; (3) determining a component x of the distance vector T on the X axis and a component y of the distance vector T on the Y axis; and (4) determining the second 3D coordinates (x, y, h).

Hence, after the center of the calibration plate coincides with the radiation field center of the X-ray tube by moving the calibration plate, the 3D coordinates of the center of the calibration plate in the X-ray tube coordinate system are simplified.

In one exemplary embodiment, the center of the calibration plate does not coincide with the radiation field center of the X-ray tube; the calibration plate is disposed in an XY plane including an X axis and a Y axis; and the determining second 3D coordinates of the positioning marker in an X-ray tube coordinate system on the basis of the distance in step 103 includes:

(1) determining 3D coordinates (Δx, Δy, h) of the center of the calibration plate in the X-ray tube coordinate system, where h represents the distance, Δx represents a component of a distance vector between the radiation field center and the center of the calibration plate on the X axis, and Δy represents a component of the distance vector between the radiation field center and the center of the calibration plate on the Y axis;

(2) determining a distance vector T between the positioning marker and the center of the calibration plate;

(3) determining a component x of the distance vector T on the X axis and a component y of the distance vector T on the Y axis; and (4) determining the second 3D coordinates (Δx+x, Δy+y, h) of the positioning marker.

Therefore, the process of moving the calibration plate to make the center of the calibration plate coincide with the radiation field center of the X-ray tube can be omitted, and thus operation steps are simplified.

Step 104: Determine, on the basis of the first 3D coordinates and the second 3D coordinates, a transformation matrix adapted to calibrate the 3D camera.

On the basis of the first 3D coordinates determined in step 102 and the second 3D coordinates determined in step 103, the transformation matrix for calibrating the 3D camera can be computed on the basis of a matrix method. To facilitate the computation of the transformation matrix, the number of the first 3D coordinates is preferably greater than 6; correspondingly, the number of the second 3D coordinates is preferably greater than 6.

The distance between the calibration plate and the X-ray tube can be adjusted multiples times, and the first 3D coordinates and the second 3D coordinates after each distance adjustment are determined, accordingly. Then, the transformation matrix is computed more accurately by using the first 3D coordinates and the second 3D coordinates determined after multiple distance adjustments. The number of the first 3D coordinates determined after multiple distance adjustments is preferably greater than 6; correspondingly, the number of the second 3D coordinates determined after multiple adjustments is preferably greater than 6.

In one exemplary embodiment, the method further includes: adjusting the distance m times, and determining the first 3D coordinates and the second 3D coordinates after each distance adjustment, where m is a positive integer greater than or equal to 1; and the determining, on the basis of the first 3D coordinates and the second 3D coordinates, a transformation matrix adapted to calibrate the 3D camera (104) includes: determining a translation vector T and a rotation matrix R, where $$T = \overline{q} = R\overline{p} \text{ and } R = V\begin{pmatrix} 1 & 0 & 0 \\ 0 & \cdots & 0 \\ 0 & 0 & det(VU^{\tau}) \end{pmatrix}U^{\tau}, \text{ where } \overline{q} =$$

-continued $$\frac{\sum_i q_i}{N}, \overline{p} = \frac{\sum_i p_i}{N},$$

N is the number of positioning markers, i is the serial number of distance adjustment, det is a determinant function, U and V are singular value decomposition of $M=(P-\overline{q})(Q-\overline{q})^T$, $q_i$, is the second 3D coordinates determined in an i-th distance adjustment, p; is the first 3D coordinates determined in the i-th distance adjustment, and the value range of i is [0, m]; and determining the transformation matrix on the basis of the translation vector T and the rotation matrix R.

Therefore, the transformation matrix is determined using multiple distance adjustments, such that the accuracy is improved.

For example, assuming that the number of positioning markers in the calibration plate is k (k is greater than 3), the distance is adjusted m times, and the first 3D coordinates and the second 3D coordinates after distance adjustment are determined.

Method (1): three corresponding 3D coordinate pairs are selected from first 3D coordinates before the distance adjustments and second 3D coordinates before the distance adjustments, then three corresponding 3D coordinate pairs are selected from first 3D coordinates after the first distance adjustment and second 3D coordinates after the first distance adjustment, and the transformation matrix is computed by using the six 3D coordinate pairs.

Method (2): three corresponding 3D coordinate pairs are selected from first 3D coordinates before the distance adjustments and second 3D coordinates before the distance adjustments, then three corresponding 3D coordinate pairs are selected from first 3D coordinates after the first distance adjustment and second 3D coordinates after the first distance adjustment, and the transformation matrix is computed by using the six 3D coordinate pairs.

Method (3): three corresponding 3D coordinate pairs are selected from first 3D coordinates after the first distance adjustment and second 3D coordinates after the first distance adjustment, then three corresponding 3D coordinate pairs are selected from first 3D coordinates after the second distance adjustment and second 3D coordinates after the second distance adjustment, and the transformation matrix is computed by using the six 3D coordinate pairs.

Specific embodiments of computing the transformation matrix are described exemplarily above, and a person skilled in the art can realize that such descriptions are only exemplary, and are not intended to limit the embodiments of the present disclosure.

Hence, in the embodiments of the present disclosure, the transformation matrix is determined on the basis of a transformation relationship between 3D coordinates of the positioning marker in the calibration plate in the X-ray tube coordinate system and 3D coordinates of the positioning marker in the 3D camera coordinate system, so as to implement calibration of the 3D camera and eliminate the system error caused by the coordinate system difference.

In one exemplary embodiment, the method further includes: determining a set radiation field range and an actual radiation field range on the calibration plate corresponding to the set radiation field range; and determining a radiation field width calibration parameter $\gamma_w$ and a radiation field height calibration parameter $\gamma_h$, where $$\gamma_w = \frac{w_c * SID}{H_1 * w_s} \text{ and } \gamma_h = \frac{h_c * SID}{H_1 * h_S},$$

where $H_1$ represents the distance between the calibration plate and the X-ray tube, SID represents the distance between the X-ray source and an imaging surface, referred to as a source to image distance, $w_s$ represents the width in the set radiation field range, $h_s$ represents the height in the set radiation field range, we represents the width in the actual radiation field range, and $h_c$ represents the height in the actual radiation field range.

The radiation field width calibration parameter $\gamma_w$ and the radiation field height calibration parameter $\gamma_h$ reflect the difference between actual and set collimator radiation fields, can be used for calibrating the system error, and can also be used for calibrating the radiation field of a virtual collimator to make the radiation field of the virtual collimator consistent with the radiation field of a real collimator. Hence, the width and height of a radiation field can also be calibrated to make the actual radiation field range consistent with the set radiation field range.

In one exemplary embodiment, the determining a set radiation field range and an actual radiation field range on the calibration plate corresponding to the set radiation field range includes the following methods:

Method (1): determining the actual radiation field range on the basis of a user input; and making an adjustment to obtain the set radiation field range corresponding to the actual radiation field range.

For example, the actual radiation field range inputted by a user is 10×10 $cm^2$. Then, a set radiation field range in an X-ray imaging system is adjusted until it is found by manually observing the calibration plate or performing image recognition on a 3D picture of the calibration plate that the actual radiation field range on the calibration plate is 10×10 $cm^2$, and at that time, the set radiation field range, assumed as 11×11 $cm^2$, in the X-ray imaging system is recorded and then considered as the set radiation field range. In this case, the actual radiation field range is 10×10 $cm^2$, and the set radiation field range corresponding to the 10×10 $cm^2$ actual radiation field range is 11×11 $cm^2$.

Method (2): determining the set radiation field range on the basis of a user input; and measuring the actual radiation field range corresponding to the set radiation field range. Therefore, the set radiation field range and the actual radiation field range can be determined in many ways to adapt to various implementation environments.

For example, the set radiation field range in the X-ray imaging system inputted by the user is 10×10 $cm^2$; then, it is found by manually observing the calibration plate or performing image recognition on the 3D picture of the calibration plate that the actual radiation field range on the calibration plate is 9×9 $cm^2$ Therefore, it is determined that the actual radiation field range is 9×9 $cm^2$, and the set radiation field range corresponding to the 9×9 $cm^2$ actual radiation field range is 10×10 $cm^2$.

Figure 2:
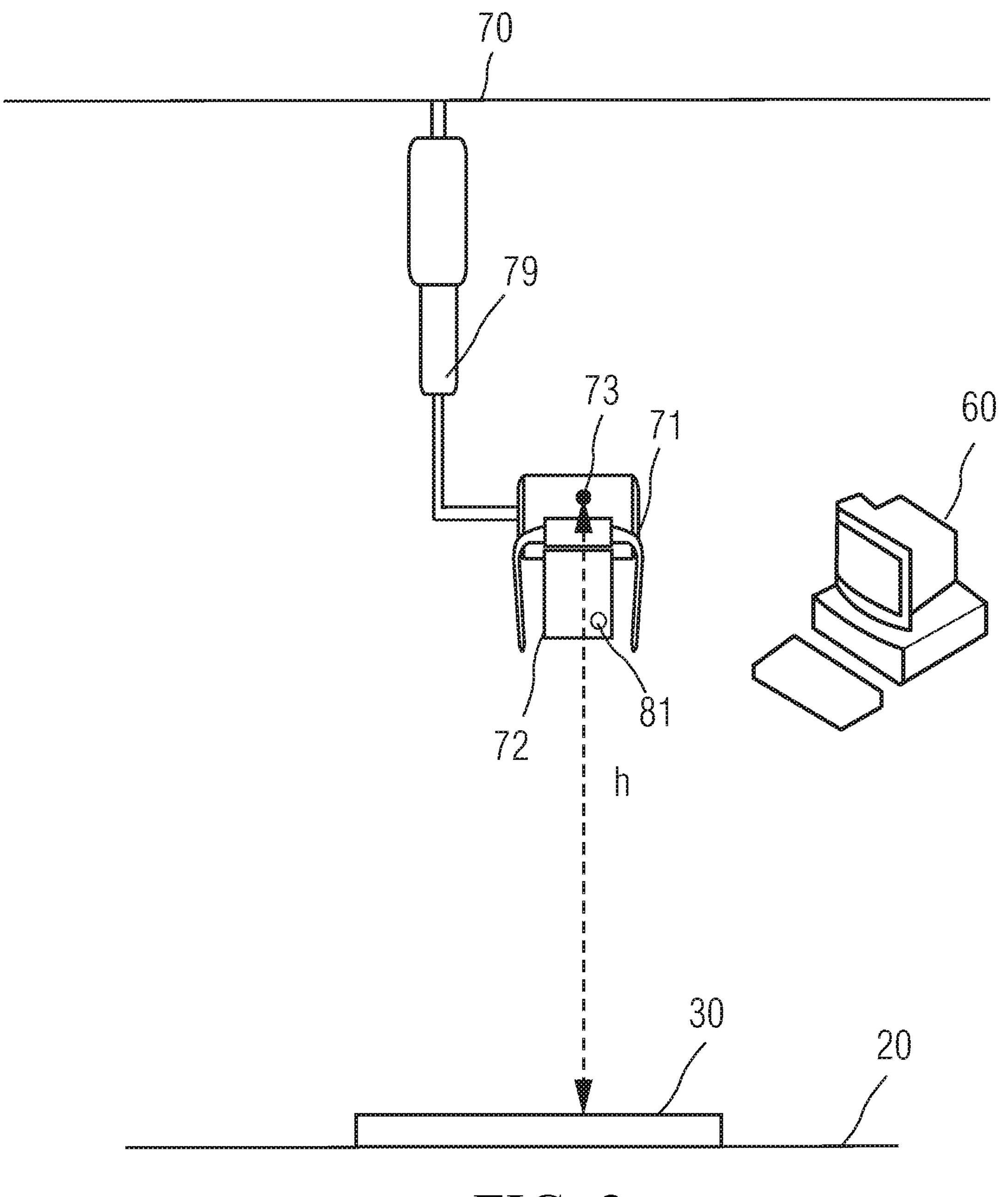
FIG. 2 is a schematic diagram of 3D camera calibration in X-ray imaging according to embodiments of the present disclosure.

FIG. 2 is a schematic diagram of 3D camera calibration in X-ray imaging according to embodiments of the present disclosure.

In FIG. 2, an X-ray generation assembly including an X-ray tube 71 and a collimator 72 is connected to a telescopic sleeve 79 using a support, and the telescopic sleeve 79 is connected to a ceiling 70. A 3D camera 81 is disposed on a shell of the collimator 72. A control host 60 may be a control host disposed in a local control room, and may also be a remote control host, such as a control host at the cloud.

A calibration plate 30 for calibrating the 3D camera 81 is disposed on the ground 20. A positioning marker for assisting positioning is disposed on the calibration plate 30, and one or more positioning markers may be provided. The X-ray tube 71 is aligned with the calibration plate 30 on the ground, and the ray direction of the X-ray tube 71 is perpendicular to the calibration plate 30. The distance between the calibration plate 30 and the X-ray tube 71 is the vertical height from an X-ray source 73 in the X-ray tube 71 to the calibration plate 30.

Figure 3:
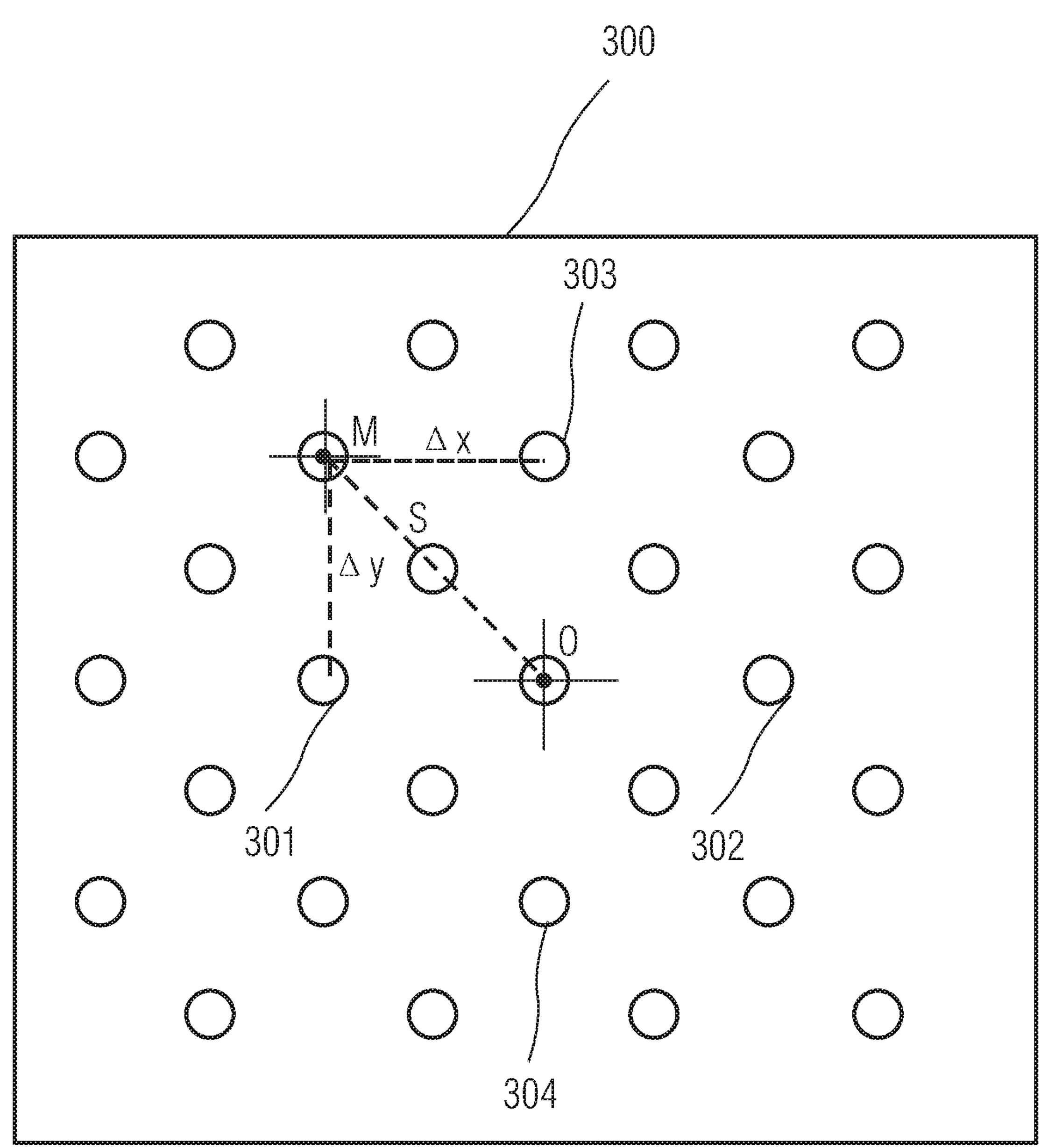
FIG. 3 is the first schematic diagram of determining 3D coordinates of the center of a calibration plate in an X-ray tube coordinate system according to embodiments of the present disclosure.

FIG. 3 is the first schematic diagram of determining 3D coordinates of the center of a calibration plate in an X-ray tube coordinate system according to embodiments of the present disclosure.

In FIG. 3, a calibration plate 300 has a plurality of circles serving as positioning markers, which is exemplified with 28 circles in the embodiment shown in FIG. 3. The 28 circles cover 7 rows, and each row cover 4 circles. The circles in each row are equidistantly spaced and the spacing is a known fixed value D; moreover, the spacing between adjacent circles in different rows is also D. For example, the first circle from the left of the first row and the second circle from the left of the first row are adjacent to each other within the same row, and the spacing is D; the second circle from the left of the first row and the third circle from the left of the first row are adjacent to each other within the same row, and the spacing is D; the first circle from the left of the first row and the first circle from the left of the second row are adjacent to each other in different rows, and the spacing is D; the first circle from the left of the first row and the second circle from the left of the second row are adjacent to each other in different rows, and the spacing is D. In FIG. 3, the distance between any two adjacent circles is the known fixed value D.

The center of the calibration plate 300 is taken as point O. The radiation field center of an X-ray tube presented on the calibration plate 300 is point M.

3D coordinates of each circle in a 3D camera coordinate system can be obtained through a 3D picture of the calibration plate 300. 3D coordinates of each circle in an X-ray tube coordinate system can be determined, accordingly, so as to facilitate computing a transformation matrix of a 3D camera.

The method for determining the 3D coordinates of each circle in the X-ray tube coordinate system includes:

case (1): in a case that it is observed that point M and point O on the calibration plate coincide, it can be determined that the 3D coordinates of the center of the plate in the X-ray tube coordinate system are (0, 0, h), and then the 3D coordinates of each circle in the X-ray tube coordinate system can be conveniently determined.

For example, assuming that it is known that the distance between the calibration plate 300 and an X-ray source of the X-ray tube is 180 cm and the distance between every two adjacent circles is 5 cm, the coordinates of the center point O of the calibration plate in the X-ray tube coordinate system can be calibrated as (0, 0, 180). Correspondingly, the coordinates of the first circle 301 on the left of the center point O in the X-ray tube coordinate system are (5, 0, 180); the coordinates of the first circle 302 on the right of the center point O in the X-ray tube coordinate system are (−5, 0, 180); the coordinates of the first circle 303 above the center point O in the X-ray tube coordinate system are (0, 5, 180), and the coordinates of the first circle 304 below the center point O in the X-ray tube coordinate system are (0, −5, 180). Similarly, the coordinates of all the circles in the X-ray tube coordinate system can be determined.

Case (2): in a case that point M and point O on the calibration plate 300 do not coincide as shown in FIG. 3, a distance vector between the radiation field center (i.e., point M) and the center of the calibration plate (i.e., point O) is S. A component of the distance vector S on an X axis is $\Delta x$, and a component of the distance vector S on a Y axis is $\Delta y$. Hence, the modulus of $\Delta x$ is D, and the modulus of $\Delta y$ is D. Therefore, in combination with a predetermined coordinate system direction, the 3D coordinates ($\Delta x$, $\Delta y$, h) of the center of the calibration plate in the X-ray tube coordinate system can be determined, where h represents the distance between the calibration plate 300 and the X-ray source of the X-ray tube. Then, a distance vector T between each circle and the center of the calibration plate can be determined, a component x of the distance vector T on the X axis and a component y of the distance vector T on the Y axis are determined, and thus the 3D coordinates ($\Delta x+x$, $\Delta y+y$, h) of each circle in the X-ray tube coordinate system are determined.

Figure 4:
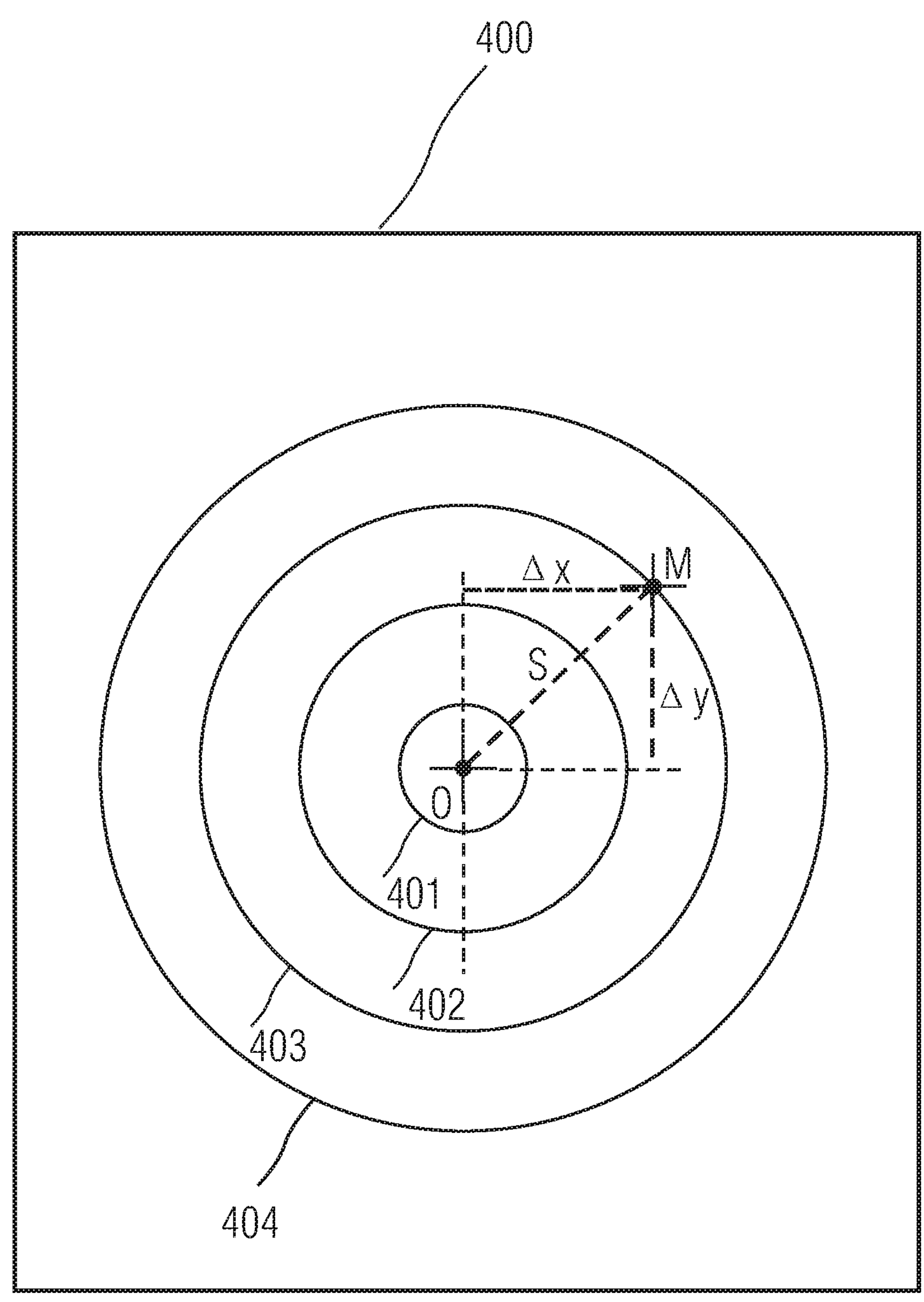
FIG. 4 is the second schematic diagram of determining 3D coordinates of the center of a calibration plate in an X-ray tube coordinate system according to embodiments of the present disclosure.

FIG. 4 is the second schematic diagram of determining 3D coordinates of the center of a calibration plate in an X-ray tube coordinate system according to embodiments of the present disclosure.

In FIG. 4, a calibration plate 400 includes positioning markers implemented as a concentric circle 401, a concentric circle 402, a concentric circle 403, a concentric circle 404, and a concentric circle 405. The radius of the concentric circle 401 is r, the radius difference between adjacent concentric circles is the same, and it is assumed that the radius difference is d. The center of the calibration plate 400 is taken as point O. The radiation field center of an X-ray tube presented on the calibration plate 400 is point M.

3D coordinates of a quadrant point (e.g., an upper quadrant point, a lower quadrant point, a left quadrant point, and a right quadrant point) of each concentric circle in a 3D camera coordinate system can be obtained through a D picture of the calibration plate 400. 3D coordinates of a quadrant point of each concentric circle in an X-ray tube coordinate system can be determined, accordingly, so as to facilitate computing a transformation matrix of a 3D camera.

The method for determining the 3D coordinates of the quadrant point of each concentric circle in the X-ray tube coordinate system includes:

Case (1): in a case that point M and point O on the calibration plate 400 coincide, it can be determined that the 3D coordinates of the center of the plate in the X-ray tube coordinate system are (0, 0, h); then, computation is performed on the basis of a geometric relationship between the concentric circles to determine the 3D coordinates of the quadrant point of each concentric circle in the X-ray tube coordinate system.

Case (2): in a case that point M on the calibration plate 400 is located on the circumference of the concentric circle 403 and point M and point O do not coincide as shown in FIG. 4, a distance vector between the radiation field center (i.e., point M) and the center (i.e., point O) of the calibration plate is S, and the modulus of distance vector is r+2d. On the basis of the direction of point M recognized by visual observation or computer vision, it is determined that a component of the distance vector S on an X axis is $\Delta x$ and a component of the distance vector S on a Y axis is $\Delta y$. For example, assuming that the angle between a connecting line between point M and point O and the X axis is 45 degrees, the modulus of Δx is $$\sqrt{(r^2+4d^2+4rd)/2},$$

and the modulus of Δy is also $$\sqrt{(r^2+4d^2+4rd)/2},$$

Therefore, in combination with a predetermined coordinate system direction, the 3D coordinates (Δx, Δy, h) of the center of the calibration plate in the X-ray tube coordinate system can be determined, where h represents the distance between the calibration plate 400 and an X-ray source of the X-ray tube. Then, a distance vector T between a pixel point of each concentric circle and the center of the calibration plate can be determined, a component x of the distance vector T on the X axis and a component y of the distance vector T on the Y axis are determined, and thus computation is performed on the basis of a geometric relationship between the concentric circles to determine the 3D coordinates (Δx+x, Δy+y, h) of each pixel point of each concentric circle in the X-ray tube coordinate system.

Figure 5:
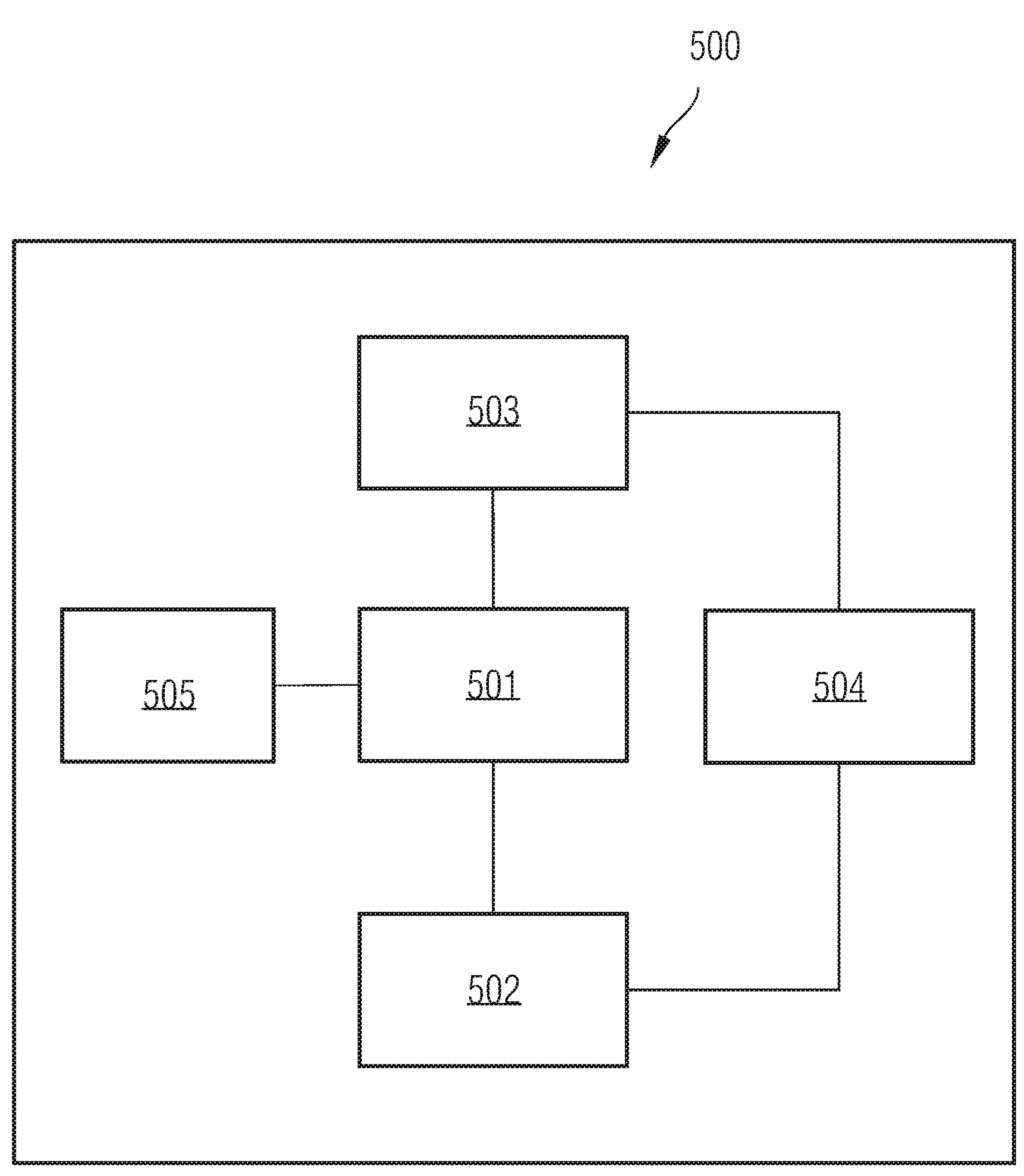
FIG. 5 is a structural diagram of an apparatus for calibrating a 3D camera in X-ray imaging according to embodiments of the present disclosure.

FIG. 5 is a structural diagram of an apparatus for calibrating a 3D camera in X-ray imaging according to embodiments of the present disclosure.

As shown in FIG. 5, an apparatus 500 for calibrating a 3D camera in X-ray imaging includes:

- an acquiring module 501, configured to acquire a 3D image of a calibration plate captured by a 3D camera, where the calibration plate includes a positioning marker, and the calibration plate has a predetermined distance from an X-ray tube;
- a first determining module 502, configured to determine first 3D coordinates of the positioning marker in a 3D camera coordinate system on the basis of the 3D image;
- a second determining module 503, configured to determine second 3D coordinates of the positioning marker in an X-ray tube coordinate system on the basis of the distance; and
- a third determining module 504, configured to determine, on the basis of the first 3D coordinates and the second 3D coordinates, a transformation matrix adapted to calibrate the 3D camera.

In one embodiment, the center of the calibration plate does not coincide with the radiation field center of the X-ray tube; the calibration plate is disposed in an XY plane including an X axis and a Y axis; and

- the acquiring module is further configured to move the calibration plate within the XY plane until the center of the calibration plate coincides with the radiation field center of the X-ray tube.

In one embodiment, the second determining module 503 is configured to: determine 3D coordinates (0, 0, h) of the center of the calibration plate in the X-ray tube coordinate system, where h represents the distance; determine a distance vector T between the positioning marker and the center of the calibration plate; determine a component x of the distance vector T on the X axis and a component y of the distance vector T on the Y axis; and determine the second 3D coordinates (x, y, h).

In one embodiment, the center of the calibration plate does not coincide with the radiation field center of the X-ray tube; the calibration plate is disposed in an XY plane including an X axis and a Y axis; and the second determining module 503 is configured to: determine 3D coordinates (Δx, Δy, h) of the center of the calibration plate in the X-ray tube coordinate system, where h represents the distance, Δx represents a component of a distance vector between the radiation field center and the center of the calibration plate on the X axis, and Δy represents a component of the distance vector between the radiation field center and the center of the calibration plate on the Y axis; determine a distance vector T between the positioning marker and the center of the calibration plate; determine a component x of the distance vector T on the X axis and a component y of the distance vector T on the Y axis; and determine the second 3D coordinates (Δx+x, Δy+y, h) of the positioning marker.

In one embodiment, the apparatus further includes: a fourth determining module 505, configured to determine a set radiation field range and an actual radiation field range on the calibration plate corresponding to the set radiation field range; and determine a radiation field width calibration parameter $\gamma_w$ and a radiation field height calibration parameter $\gamma_h$, where $$\gamma_w = \frac{w_c * SID}{H_1 * w_s} \text{ and } \gamma_h = \frac{h_c * SID}{H_1 * h_S},$$

where $H_1$ represents the distance, SID represents a preset source to image distance, $w_s$ represents the width in the set radiation field range, $h_s$ represents the height in the set radiation field range, $w_c$ represents the width in the actual radiation field range, and $h_c$ represents the height in the actual radiation field range.

In one embodiment, the fourth determining module 505 is configured to: determine the actual radiation field range on the basis of a user input; and make an adjustment to obtain the set radiation field range corresponding to the actual radiation field range; or, determine the set radiation field range on the basis of a user input; and measure the actual radiation field range corresponding to the set radiation field range on the calibration plate.

In one embodiment, the third determining module 504 is further configured to: adjust the distance m times, and determine the first 3D coordinates and the second 3D coordinates after each distance adjustment, where m is a positive integer greater than or equal to 1; and determine a translation vector T and a rotation matrix R, where $$T = \overline{q} = R\overline{p} \text{ and } R = V\begin{pmatrix} 1 & 0 & 0 \\ 0 & \cdots & 0 \\ 0 & 0 & det(VU^\tau) \end{pmatrix}U^\tau, \text{ where } \overline{q} = \frac{\sum_i q_i}{N}, \overline{p} = \frac{\sum_i p_i}{N},$$

N is the number of positioning markers, i is the serial number of distance adjustment, det is a determinant function, U and V are singular value decomposition of $M=(P-\overline{q})(Q-\overline{q})^T$, $q_i$ is the second 3D coordinates determined in an i-th distance adjustment, $p_i$ is the first 3D coordinates determined in the i-th distance adjustment, and the value range of i is [0, m].

Figure 6:
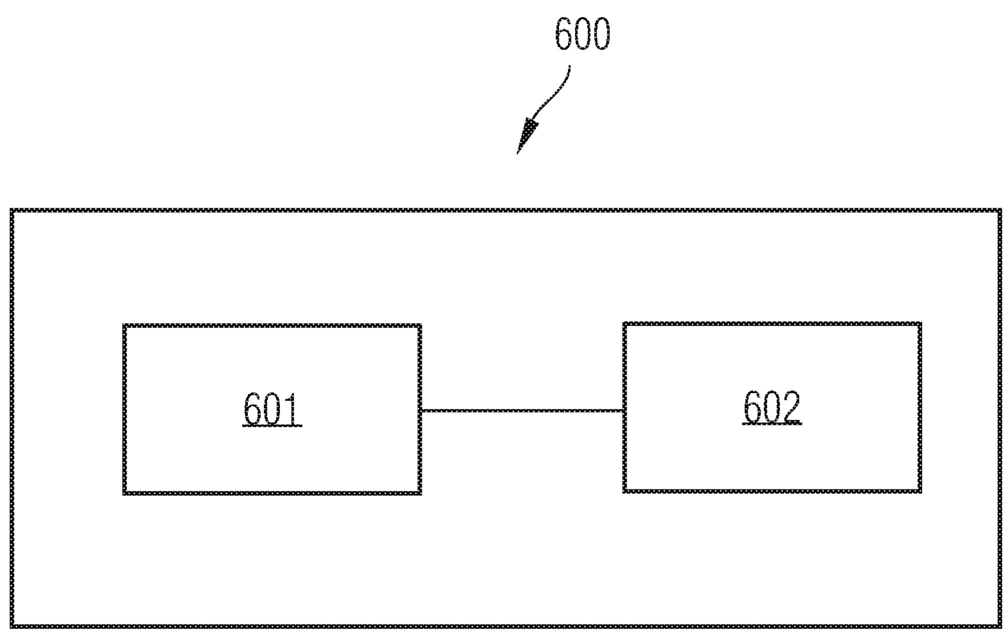
FIG. 6 is a structural diagram of an apparatus for calibrating a 3D camera in X-ray imaging having a processor-memory architecture according to embodiments of the present disclosure.

Embodiments of the present disclosure further provide an apparatus for calibrating a 3D camera in X-ray imaging having a processor-memory architecture. FIG. 6 is a structural diagram of an apparatus for calibrating a 3D camera in X-ray imaging having a processor-memory architecture according to embodiments of the present disclosure.

As shown in FIG. 6, an apparatus 600 in which an industrial edge application is deployed includes a processor 601, a memory 602, and a computer program stored on the memory 602 and capable of running on the processor 601, where when executed by the processor 601, the computer program implements the method for calibrating a 3D camera in X-ray imaging according to any one of the foregoing embodiments. The memory 602 may be specifically implemented as various storage media such as an electrically-erasable programmable read-only memory (EEPROM), a flash memory, and a programmable read-only memory (PROM). The processor 601 may be implemented to include one or more central processing units (CPUs) or one or more field-programmable gate arrays, where the field-programmable gate arrays integrate one or more CPU cores. Specifically, the CPU or the CPU core may be implemented as a CPU or an MCU or a DSP or the like.

Not all steps in the foregoing flowchart and not all modules in the foregoing structural diagrams are necessary, and some steps or modules can be omitted according to actual requirements. An execution order of the steps is not fixed and may be adjusted according to requirements. Division of modules is only for the convenience of describing division of functions used. In practical implementation, one module can be implemented by a plurality of modules, and functions of a plurality of modules can also be implemented by a same module. The modules can be located in a same device, and can also be located in different devices.

Hardware modules in the embodiments can be implemented mechanically or electronically. For example, a hardware module may include a dedicated permanent circuit or logic device (e.g., a dedicated processor, an FPGA or an ASIC) to complete a corresponding operation. A hardware module may also include a programmable logic device or circuit temporarily configured by software (e.g., including a general-purpose processor or other programmable processors) to execute a corresponding operation. For the specific mechanical form, a dedicated permanent circuit or a temporarily configured circuit (configured by software) may be used to implement a hardware module, which can be determined based on costs and time considerations.

The foregoing descriptions are merely exemplary embodiments of the present disclosure and are not intended to limit the scope of protection of the present disclosure. Any modification, equivalent replacement, or improvement made within the spirit and principle of the present disclosure shall fall within the scope of protection of the present disclosure.

The various components described herein may be referred to as "modules." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, as applicable and relevant, may alternatively be referred to herein as "circuitry," "controllers," "processors," or "processing circuitry," or alternatively as noted herein.

The invention claimed is:

1. A method for calibrating a three-dimensional (3D) camera in X-ray imaging, comprising:

acquiring a 3D image of a calibration plate that has been captured by a 3D camera, wherein the calibration plate comprises a positioning marker, and wherein the calibration plate is disposed a distance from an X-ray tube;

computing first 3D coordinates of the positioning marker in a 3D camera coordinate system based upon the 3D image;

computing second 3D coordinates of the positioning marker in an X-ray tube coordinate system based upon the distance;

computing, based upon the first 3D coordinates and the second 3D coordinates, a transformation matrix adapted to calibrate the 3D camera;

calibrating the 3D camera based upon the transformation matrix;

computing a first radiation field range and a second radiation field range on the calibration plate corresponding to the first radiation field range; and computing a radiation field width calibration parameter $y_w$ and a radiation field height calibration parameter $y_h$ by evaluating;

$$\gamma_w = \frac{w_c * SID}{H_1 * w_s} \text{ and } \gamma_h = \frac{h_c * SID}{H_1 * h_S},$$

wherein:

$H_1$ represents the distance,

SID represents a source to image distance, $w_s$ represents a width in the first radiation field range, $h_s$ represents a height in the first radiation field range, $w_c$ represents a width in the second radiation field range, and $h_c$ represents a height in the second radiation field range.

2. The method according to claim 1, wherein a center of the calibration plate does not initially coincide with a radiation field center of the X-ray tube, and wherein the calibration plate is disposed in an XY plane comprising an X axis and a Y axis, and further comprising:

moving the calibration plate within the XY plane until the center of the calibration plate coincides with the radiation field center of the X-ray tube.

3. The method according to claim 2, wherein the computing the second 3D coordinates of the positioning marker in the X-ray tube coordinate system comprises:

computing 3D coordinates (0, 0, h) of the center of the calibration plate in the X-ray tube coordinate system, wherein h represents the distance;

computing a distance vector T between the positioning marker and the center of the calibration plate;

computing a component x of the distance vector T on the X axis and a component y of the distance vector T on the Y axis; and computing the second 3D coordinates (x, y, h).

4. The method according to claim 1, wherein:

a center of the calibration plate does not initially coincide with a radiation field center of the X-ray tube, the calibration plate is disposed in an XY plane comprising an X axis and a Y axis, the computing the second 3D coordinates of the positioning marker in the X-ray tube coordinate system comprises:

computing 3D coordinates ($\Delta x$, $\Delta y$, h) of the center of the calibration plate in the X-ray tube coordinate system, wherein:

h represents the distance, $\Delta x$ represents a component of a distance vector between the radiation field center of the X-ray tube and the center of the calibration plate on the X axis, and $\Delta y$ represents a component of a distance vector between the radiation field center of the X-ray tube and the center of the calibration plate on the Y axis;

computing a distance vector T between the positioning marker and the center of the calibration plate;

computing a component x of the distance vector T on the X axis and a component y of the distance vector T on the Y axis; and computing the second 3D coordinates ($\Delta x+x$, $\Delta y+y$, h) of the positioning marker.

5. The method according to claim 1, wherein the computing the first radiation field range and the second radiation field range on the calibration plate comprises:

computing the second radiation field range on the basis of a user input; and (i) adjusting the second radiation field range to obtain the first radiation field range, or (ii) computing the first radiation field range based upon a user input; and measuring the second radiation field range corresponding to the first radiation field range.

6. The method according to claim 1, further comprising:

iteratively adjusting the distance m times; and computing the first 3D coordinates and the second 3D coordinates after each iterative distance adjustment, wherein:

m represents a positive integer greater than or equal to 1; and computing the transformation matrix based upon the first 3D coordinates and the second 3D coordinates comprises computing a translation vector T and a rotation matrix R by evaluating:

$$T=\overline{q}=R\overline{p}, \text{ and}$$

$$R=V\begin{pmatrix}1 & 0 & 0\\ 0 & \cdots & 0\\ 0 & 0 & det(VU^{T})\end{pmatrix}U^{T}, \text{ wherein:}$$

$$\overline{q}=\frac{\sum_i q_i}{N},$$

$$\overline{p}=\frac{\sum_i p_i}{N},$$

N represents a number of positioning markers, i represents a serial number of distance adjustment, det represents a determinant function, U and V represent singular value decomposition of $M=(P-\overline{q})(Q-\overline{q})^T$, $q_i$ represents a second three-dimensional coordinates determined in an i-th distance adjustment, $p_i$ represents the first 3D coordinates determined in an i-th distance adjustment, and a value range of i is represented as [0, m]; and computing the transformation matrix based upon the translation vector T and the rotation matrix R.

7. An apparatus for calibrating a three-dimensional (3D) camera in X-ray imaging, comprising:

acquisition circuitry configured to a 3D image of a calibration plate that has been captured by a 3D camera, wherein the calibration plate comprises a positioning marker, and wherein the calibration plate is disposed a distance from an X-ray tube; and processing circuitry configured to:

compute first 3D coordinates of the positioning marker in a 3D camera coordinate system based upon the 3D image;

compute second 3D coordinates of the positioning marker in an X-ray tube coordinate system based upon the distance;

compute, based upon the first 3D coordinates and the second 3D coordinates, a transformation matrix adapted to calibrate the 3D camera; and calibrate the 3D camera based upon the transformation matrix;

compute a first radiation field range and a second radiation field range on the calibration plate corresponding to the first radiation field range; and compute a radiation field width calibration parameter $y_w$ and a radiation field height calibration parameter $y_h$ by evaluating:

$$\gamma_w=\frac{w_c * SID}{H_1 * w_s} \text{ and } \gamma_h=\frac{h_c * SID}{H_1 * h_S},$$

wherein:

$H_1$ represents the distance,

SID represents a source to image distance, $w_s$ represents a width in the first radiation field range, $h_s$ represents a height in the first radiation field range, $w_c$ represents a width in the second radiation field range, and $h_c$ represents a height in the second radiation field range.

8. The apparatus according to claim 7, wherein:

a center of the calibration plate does not initially coincide with a radiation field center of the X-ray tube, and the calibration plate is disposed in an XY plane comprising an X axis and a Y axis, and the acquisition circuitry is further configured to cause the calibration plate to move within the XY plane until the center of the calibration plate coincides with the radiation field center of the X-ray tube.

9. The apparatus according to claim 8, wherein the processing circuitry is configured to:

compute 3D coordinates (0, 0, h) of the center of the calibration plate in the X-ray tube coordinate system, wherein h represents the distance;

compute a distance vector T between the positioning marker and the center of the calibration plate;

compute a component x of the distance vector T on the X axis and a component y of the distance vector T on the Y axis; and compute the second 3D coordinates (x, y, h).

10. The apparatus according to claim 7, wherein:

a center of the calibration plate does not initially coincide with a radiation field center of the X-ray tube, the calibration plate is disposed in an XY plane comprising an X axis and a Y axis, and the processing circuitry is configured to compute the second 3D coordinates of the positioning marker in the X-ray tube coordinate system by:

computing 3D coordinates (Δx, Δy, h) of the center of the calibration plate in the X-ray tube coordinate system, wherein:

h represents the distance,

Δx represents a component of a distance vector between the radiation field center of the X-ray tube and the center of the calibration plate on the X axis, and Δy represents a component of a distance vector between the radiation field center of the X-ray tube and the center of the calibration plate on the Y axis;

computing a distance vector T between the positioning marker and the center of the calibration plate;

computing a component x of the distance vector T on the X axis and a component y of the distance vector T on the Y axis; and computing the second 3D coordinates (Δx+x, Δy+y, h) of the positioning marker.

11. The apparatus according to claim 7, wherein the processing circuitry is configured to compute the first radiation field range and the second radiation field range on the calibration plate by:

computing the second radiation field range on the basis of a user input; and (i) adjusting the second radiation field range to obtain the first radiation field range, or (ii) computing the first radiation field range based upon a user input; and measuring the second radiation field range corresponding to the first radiation field range.

12. The apparatus according to claim 7, wherein the processing circuitry is further configured to:

iteratively adjust the distance m times; and compute the first 3D coordinates and the second 3D coordinates after each iterative distance adjustment, wherein:

m represents a positive integer greater than or equal to 1; and computing the transformation matrix based upon the first 3D coordinates and the second 3D coordinates comprises computing a translation vector T and a rotation matrix R by evaluating:

$$T = \overline{q} = R\overline{p}, \text{ and}$$

$$R = V\begin{pmatrix} 1 & 0 & 0 \\ 0 & \cdots & 0 \\ 0 & 0 & det(VU^{\tau}) \end{pmatrix}U^{\tau}, \text{ wherein:}$$

$$\overline{q} = \frac{\sum_i q_i}{N},$$

$$\overline{p} = \frac{\sum_i p_i}{N},$$

N represents a number of positioning markers, i represents a serial number of distance adjustment, det represents a determinant function, U and V represent singular value decomposition of $M=(P-\overline{q})(Q-\overline{q})^T$, $q_i$ represents a second three-dimensional coordinates determined in an i-th distance adjustment, $p_i$ represents the first 3D coordinates determined in an i-th distance adjustment, and a value range of i is represented as [0, m]; and compute the transformation matrix based upon the translation vector T and the rotation matrix R.

13. A non-transitory computer-readable storage medium, having computer-readable instructions stored thereon that, when executed by processing circuitry, perform a calibration of a three-dimensional (3D) camera in X-ray imaging by:

acquiring a 3D image of a calibration plate that has been captured by a 3D camera, wherein the calibration plate comprises a positioning marker, and wherein the calibration plate is disposed a distance from an X-ray tube;

computing first 3D coordinates of the positioning marker in a 3D camera coordinate system based upon the 3D image;

computing second 3D coordinates of the positioning marker in an X-ray tube coordinate system based upon the distance;

computing, based upon the first 3D coordinates and the second 3D coordinates, a transformation matrix adapted to calibrate the 3D camera; and calibrating the 3D camera based upon the transformation matrix;

compute a first radiation field range and a second radiation field range on the calibration plate corresponding to the first radiation field range; and compute a radiation field width calibration parameter $y_w$ and a radiation field height calibration parameter $y_h$ by evaluating:

$$\gamma_w = \frac{w_c * SID}{H_1 * w_\varepsilon}$$

and $$\gamma_h = \frac{h_c * SID}{H_1 * h_s}.$$

wherein:

$H_1$ represents the distance,

SID represents a source to image distance, $w_s$ represents a width in the first radiation field range, $h_s$ represents a height in the first radiation field range, $w_c$ represents a width in the second radiation field range, and $h_c$ represents a height in the second radiation field range.

* * * * *